UNITED STATES PATENT OFFICE.

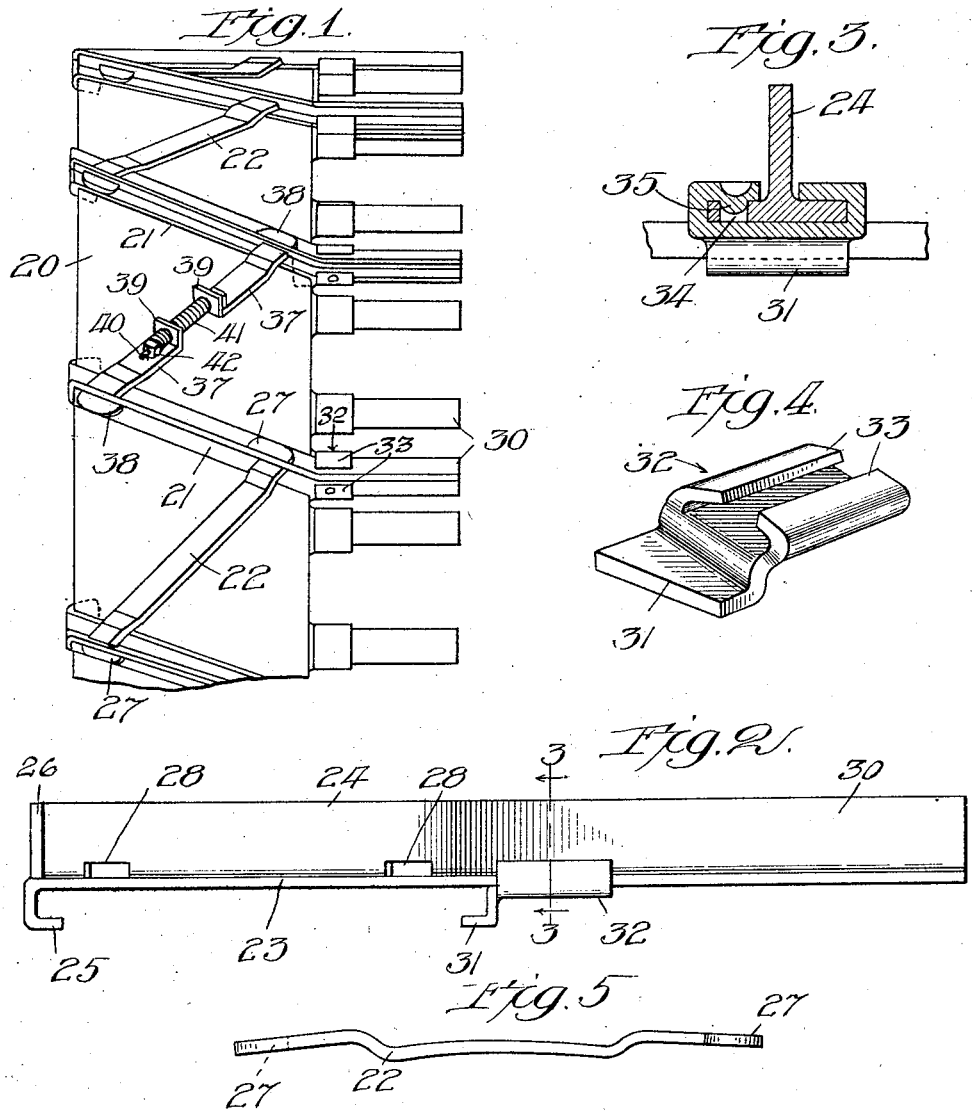

AUGUST E. MUELLER, OF CHICAGO, ILLINOIS, ASSIGNOR, BY DIRECT AND MESNE ASSIGNMENTS, TO UNIVERSAL LUG COMPANY, OF CHICAGO, ILLINOIS, A CORPORATION OF DELAWARE.

DETACHABLE TREAD STRUCTURE FOR VEHICLE WHEELS.

1,405,542.   Specification of Letters Patent.   Patented Feb. 7, 1922.

Application filed July 23, 1917. Serial No. 182,104.

*To all whom it may concern:*

Be it known that I, AUGUST E. MUELLER, a citizen of Argentina, South America, and a resident of Chicago, in the county of Cook and State of Illinois, have invented certain new and useful Improvements in Detachable Tread Structures for Vehicle Wheels, (No. 3;) and I do hereby declare that the following is a full, clear, and exact description thereof, reference being had to the accompanying drawings, and to the characters of reference marked thereon, which form a part of this specification.

This invention relates to a novel tread structure for vehicle wheels and refers more specifically to a tread structure which is adaptable to wheels for tractors and other implements for agriculture and like uses. The present invention is an improvement of that type of tread structure (sometimes called lugs) shown in my prior U. S. Patent No. 1,205,653, dated November 21, 1916, and shown also in my prior application for U. S. Letters Patent, Serial No. 141,261, filed January 8, 1917.

Among the objects of the present invention is to provide tread structure for vehicle wheels, the parts of which may be made up from standard or commercial rolled shapes such as angle iron T-iron, etc.

A further object of the invention is to provide a novel construction wherein all of the different parts of the tread structure are shaped to provide ground engaging salients.

Other objects of the invention are to simplify and improve tread structures for vehicle wheels, and the invention consists in the combination and arrangement of the parts shown in the drawing and described in the specification, and is pointed out in the appended claims.

In the drawings:—

Figure 1 is an elevation of a fragment of a wheel rim, showing one form of my improved tread structure applied thereto.

Figure 2 is a side elevation of one of the lugs of the tread structure and its extension.

Figure 3 is a transverse section on the line 3—3 of Figure 2.

Figure 4 is a perspective view of a hook clip associated with the lug shown in Figure 2.

Figure 5 is an edge elevation of one of the links for connecting the grip bars.

As shown in the drawings, 20 designates a wheel rim; 21, 21 designate grip bars, which are shown as disposed diagonally across the face of the rim, and 22, 22 designate connecting members or links which are also arranged diagonally across the face of the rim and serve to connect the grip bars. The grip bars shown are shown as of T-shaped cross section. The webs 23 of the grip bars lie flat on the wheel rim and the grip salients are constituted by the flanges 24 to said bars.

The links 22 which join the grip bars are provided at their ends with hooks 27, which engage openings or sockets 28 at the bases of the salient flanges 24. The hooks of each bar tend in opposite directions to facilitate the connection of the links with the grip bars. The outer ends of the links may be bent outwardly a distance equal to the thickness of the webs 23, so that the middle portions of the links lie on the rim. The link hooks engage the bases of the said salient flanges at the sides of said openings or sockets.

The grip bars shown in Figures 1, 2 and 3 are provided with obtusely angled extensions 30, preferably made integral parts of the bars, the flanges 24 being carried outwardly along the full lengths of the extensions to constitute auxiliary grip salients. Said extensions are particularly adaptable for use on soft or sandy ground. The wide faces of the webs 23 constitute auxiliary supporting surfaces to support the load brought on the wheel. Furthermore, the salient flanges serve also to strengthen the extensions.

A rim edge engaging hook 25 is formed on one end of each of the bars carrying such extensions, that is, the end of the bar associated with the inner edge of the wheel rim. At the other end the bar is provided with a separately formed rim edge engaging hook 31 which, as herein shown, is made part of a clip 32 that is adapted to engage over the web and is provided with wings 33 which lie on the outer side of the web, at each side of the flange, and are adapted to be hot pressed against the web, or to be otherwise fixed thereto. The said clip is slid endwise over the bar when the wings are slightly open and when brought to the proper location on the bar the wings, which are either previously heated or heated when so applied, are pressed or hammered down over the web. In order to form a good interlocking connection between the parts, the web may be provided at one or both sides of the flange with an opening 34, Figure 3, into which a portion 35 of one of the wings may be forced under proper pressure and temperature.

The lug or grip bar extensions 30 are disposed at such oblique angles to the longitudinal axes of said bars as to extend approximately parallel to the axis of rotation of the wheel. In this manner the full length of the extensions for supporting purposes is attained, and said extensions afford no impedance to the rotation of the wheel, such as would occur if the extensions were directed axially endwise from the bars, and said extensions are therefore better protected against deformation under traction stress.

The ends of the tread structure, made up of the flexibly connecting members shown in Figure 1, are shown as connected by means which obviate the necessity of punching holes in the wheel rim. The connection shown consists of two short link sections 37, 37, each of which is provided at one end with a hook 38 to engage the socket 28 in a neighboring grip bar; and said sections are provided with apertured, outstanding lugs 39 to receive a connecting bolt 40 having a screw threaded locking nut. To protect the threads of the bolt, washers 41 (or a spiral spring may be employed) are applied over the bolt between the lugs 39 and also between one of the lugs and the nut.

It will be understood that the structural details and relative arrangements of the members of the tread structure may be considerably varied over those herein shown and re-arranged with respect to each other, and that the invention is not limited to the structural details herein shown except as to claims wherein the details are specifically set forth and as imposed by the prior art.

I claim as my invention:—

1. A tread structure for vehicle wheels comprising a series of grip bars each of which consists of a base which rests on the wheel rim, and an outstanding longitudinal flange, and links arranged between the bars and detachably interlocked at their ends thereto at the junctions of the bases and flanges.

2. A tread structure for vehicle wheels comprising a series of bars extending across the wheel rim, each comprising a base portion and a salient flange extending lengthwise of the bar, said flanges provided at their bases with openings, and links extending diagonally across the rim and formed at their ends with hooks to engage said openings.

3. A tread structure for vehicle wheels comprising a series of grip bars each of which consists of a base which rests on the wheel rim and an outstanding longitudinal flange, and links arranged between the bars and interlocked at their ends thereto, said bars being provided with extensions which extend beyond the wheel rim and disposed at obtuse angles to the bars and said flanges being continued throughout the lengths of said extensions.

4. In a tread structure for vehicle wheels, a tread bar or lug comprising a base which is adapted to extend across the rim and provided with hooks to engage over the edges of the rim and provided with an outstanding salient flange extending lengthwise of the base, said bar being provided with an endwise extension, and said flange being continued along the length of said extension to serve as auxiliary salient, one of said hooks of said bar being on separately formed member attached to the bar.

5. In a tread structure for vehicle wheels, a tread bar or a lug adapted to extend across a wheel rim and comprising a base portion and a salient flange extending longitudinally thereof, an extension extending endwise from the bar at an angle thereto and said flange being continued along said extension to constitute an auxiliary salient, one end of said base being formed to provide a hook to engage over one edge of the rim and a separately formed hook applied to the bar to engage the other edge of the rim.

In testimony that I claim the foregoing as my invention, I affix my signature in the presence of two witnesses this 17th day of July, A. D. 1917.

AUGUST E. MUELLER.

Witnesses:
G. A. SOUTHWELL,
W. L. HALL.